US009718367B2

(12) United States Patent
McGrath et al.

(10) Patent No.: US 9,718,367 B2
(45) Date of Patent: Aug. 1, 2017

(54) SIDE-FACING VEHICLE CHARGING SYSTEM

(71) Applicant: Proterra Inc., Greenville, SC (US)

(72) Inventors: Seamus McGrath, Simpsonville, SC (US); Keyur Shah, Greenville, SC (US); Marc Gottschalk, Portola Valley, CA (US); Michael C. Walker, Greenville, SC (US)

(73) Assignee: Proterra Inc., Greenville, SC (US)

( * ) Notice: Subject to any disclaimer, the term of this patent is extended or adjusted under 35 U.S.C. 154(b) by 124 days.

(21) Appl. No.: 14/420,872

(22) PCT Filed: Aug. 29, 2013

(86) PCT No.: PCT/US2013/057385
§ 371 (c)(1),
(2) Date: Feb. 10, 2015

(87) PCT Pub. No.: WO2014/036319
PCT Pub. Date: Mar. 6, 2014

(65) Prior Publication Data
US 2015/0314695 A1  Nov. 5, 2015

Related U.S. Application Data

(60) Provisional application No. 61/695,264, filed on Aug. 30, 2012.

(51) Int. Cl.
*H02J 7/00* (2006.01)
*B60L 11/18* (2006.01)
(Continued)

(52) U.S. Cl.
CPC ............. *B60L 11/1816* (2013.01); *B60L 5/36* (2013.01); *B60L 5/42* (2013.01); *B60L 11/007* (2013.01);
(Continued)

(58) Field of Classification Search
CPC .................................................. B60L 11/1816
(Continued)

(56) References Cited

U.S. PATENT DOCUMENTS 3,880,264 A    4/1975  Corkum
4,158,802 A    6/1979  Rose
(Continued)

FOREIGN PATENT DOCUMENTS

EP           2380707      10/2011
KR      10-2010-0012562    2/2010
(Continued)

*Primary Examiner* — Edward Tso
*Assistant Examiner* — Ahmed Omar
(74) *Attorney, Agent, or Firm* — Bookoff McAndrews, PLLC

(57) ABSTRACT

A vehicle charging system comprises a plurality of retractable conductor bars in a housing of a vehicle. The plurality of conductor bars includes a positive conductor bar and a negative conductor bar. Individual conductor bars of the plurality are electrically isolated from one another. The vehicle charging system further comprises a charging system having a receiver mounted on a support structure. The receiver comprises a plurality of electrical contact members in electrical communication with a power source. The receiver is configured to bring individual conductor bars of the plurality in contact with the electrical contact members for charging an energy storage device of the vehicle.

20 Claims, 10 Drawing Sheets

(51) Int. Cl.
*B60R 16/033* (2006.01)
*B60L 5/36* (2006.01)
*B60L 5/42* (2006.01)
*B60L 11/00* (2006.01)

(52) U.S. Cl.
CPC ......... *B60L 11/185* (2013.01); *B60L 11/1818* (2013.01); *B60L 11/1824* (2013.01); *B60L 11/1837* (2013.01); *B60R 16/033* (2013.01); B60L 2200/10 (2013.01); B60L 2200/12 (2013.01); B60L 2200/18 (2013.01); B60L 2200/26 (2013.01); B60L 2200/36 (2013.01); B60L 2230/40 (2013.01); B60L 2240/70 (2013.01); Y02T 10/7005 (2013.01); Y02T 10/7094 (2013.01); Y02T 10/7291 (2013.01); Y02T 90/121 (2013.01); Y02T 90/128 (2013.01); Y02T 90/14 (2013.01); Y02T 90/16 (2013.01); Y02T 90/163 (2013.01); Y02T 90/168 (2013.01); Y04S 30/12 (2013.01)

(58) Field of Classification Search
USPC .......................................................... 320/109
See application file for complete search history.

(56) References Cited

U.S. PATENT DOCUMENTS

| | | | |
|---|---|---|---|
| 8,453,773 | B2 | 6/2013 | Hill et al. |
| 2010/0039067 | A1* | 2/2010 | Hill ............ B60L 5/42 320/109 |
| 2013/0057211 | A1 | 3/2013 | Kuribayashi |
| 2013/0076902 | A1* | 3/2013 | Gao ............ B25J 9/042 348/148 |
| 2013/0127414 | A1 | 5/2013 | Ohtomo |

FOREIGN PATENT DOCUMENTS

| | | |
|---|---|---|
| WO | WO/2010/132443 | 11/2010 |
| WO | WO/2011/139680 | 2/2012 |
| WO | WO/2012/040369 | 6/2012 |
| WO | WO/2011/139675 | 3/2014 |

* cited by examiner

SIDE-FACING VEHICLE CHARGING SYSTEM

CROSS-REFERENCE

This application claims priority to U.S. Provisional Patent Application No. 61/695,264, filed Aug. 30, 2012, which is entirely incorporated herein by reference for all purposes.

BACKGROUND

Electric vehicles are limited by current infrastructure for transferring power to the electric vehicles. Some electric vehicles, such as electric trains and light rail cars, are permanently connected to a power source through hardware in the railing or through overhead lines. Other electric vehicles, such as electric cars, are charged by plugging in the electric vehicle at a charging station.

While systems for maintaining a permanent electrical connection along a route taken by an electric vehicle can be used to transfer power to the electric vehicle, these systems are an eyesore, are unpopular, are costly to install and maintain, and can be unsafe. These systems may require the entire electric bus line to be suspended for periods of time while cities perform routing building maintenance or construction. Some of these systems do not enable an electrical vehicle to run independent of a railing or overhead line. Also, some of these systems are not adaptable to different vehicles with different characteristics. Furthermore, these systems may take a significant amount of time and effort to charge.

SUMMARY

Recognized herein is a need for improved systems and methods for charging electric vehicles, such as electric buses.

The present disclosure provides systems and methods for charging an electric vehicle. Vehicle-side charging systems and charge station-side charging systems are described. Such systems are capable of working together to deliver energy to an electric vehicle, including an energy storage device of the electric vehicle. Systems of the present disclosure are capable of fast or substantially fast charging or discharging of an electric vehicle. In some examples, vehicle charging or discharging is enabled with the aid of high current connections.

In an aspect, a vehicle charging system comprises a plurality of retractable conductor bars in a housing of a vehicle. The plurality of conductor bars comprises a positive conductor bar, a negative conductor bar, and a ground bar. Individual conductor bars of the plurality are electrically isolated from one another. The charging system further comprises a charging system having a receiver mounted on a support structure. The receiver comprises a plurality of electrical brushes in electrical communication with a power source. The receiver is configured to bring individual conductor bars of the plurality in contact with the electrical brushes for providing charge to the vehicle. This relationship may also be reversed such that the receiver is on the vehicle and the conductor bars are housed in or contained in a pole system on the side of the road or other driving surface.

In another aspect, a charging station for charging an electric vehicle comprises a receiver comprising a plurality of side-facing tracks that are each configured to accept a conductor bar among a plurality of conductor bars of the electric vehicle, wherein the receiver comprise electrical contact members in the plurality of side-facing tracks, at least a subset of which are in electrical communication with a power source, and wherein the plurality of side-facing tracks are configured to guide the plurality of conductor bars towards the electrical contact members for vehicle charging. In some embodiments, the electrical contact members comprise a first set of contact members and a second set of contact members that are each in electrical communication with an opposing pole of the power source. In some embodiments, the electrical contact members are brushes. In some embodiments, the electrical contact members comprise a plurality of electrical brushes in electrical communication with the power source, wherein the receiver is configured to bring individual conductor bars of the plurality in contact with the electrical brushes for providing charge to the vehicle. In some embodiments, the receiver is mounted on a stand that permits the receiver to rotate along a direction of vehicle movement. In some embodiments, the receiver comprises an upper funnel wall and a lower funnel wall, wherein the upper funnel wall is wider than the lower funnel wall. In some embodiments, the receiver further comprises a plurality of polymeric inserts situated along a portion of each of the side-facing tracks.

In another aspect, an electric vehicle, comprises a body comprising a motion-inducing device; an energy storage device coupled to the motion-inducing device; and a plurality of conductor bars that are configured to extend away from and retract towards a side of the body, wherein the plurality of conductor bars comprise a positive conductor bar and a negative conductor bar, wherein individual conductor bars of the plurality are electrically isolated from one another and are individually electrically coupled to an opposing pole of the energy storage device. In some embodiments, the body is formed of aluminum, steel, a magnesium alloy or fiberglass. In some embodiments, the conductor bars extend and retract in unison. In some embodiments, the body comprises a chamber to house the plurality of conductor bars in a retracted position. In some embodiments, the conductor bars are spaced apart from one another. In some embodiments, the plurality of conductor bars further comprises a ground bar between the positive conductor bar and the negative conductor bar. In some embodiments, the positive conductor bar and the negative conductor bar each comprises one or more conductor surfaces. In some embodiments, the positive conductor bar and the negative conductor bar are flexible. In some embodiments, the conductor bars extend out of and retract towards the side of the body by pivoting along a pivot point. In some embodiments, the conductor bars extend out of and retract towards the side of the body with the aid of a retraction guide coupled to (i) a retraction mechanism and (ii) both of the conductor bars.

In another aspect, a method for charging an electric vehicle comprises a) directing the electric vehicle towards a charging station, wherein the electric vehicle comprises a body, an energy storage device and a plurality of conductor bars that are configured to extend away from and retract towards a side of the body, wherein the plurality of conductor bars comprise a positive conductor bar and a negative conductor bar, wherein individual conductor bars of the plurality are electrically isolated from one another and are individually electrically coupled to an opposing pole of the energy storage device; b) extending the conductor bars away from the side of the body towards a receiver of the charging station; c) electrically coupling the positive conductor bar and the negative conductor bar to separate electrical contact members of the receiver; and d) charging the energy storage device through electrical contact established between the electrical contact members and the conductor bars. In some embodiments, the method comprises retracting the conductor bars towards the body after charging. In some embodiments, in (b), the conductor bars are extended away from the body as the electric vehicle approaches the charging station. In some embodiments, the method comprises charging the energy storage to a state of charge of at least about 50% in a time period that is less than or equal to about 15 minutes. In some embodiments, the method comprises delivering at least about 50 kWh of energy in a time period that is less than about 15 minutes. In some embodiments, the method comprises retracting the conductor bars away from the charging station.

In another aspect, a computer readable medium comprises machine-executable code that, upon execution by a computer processor, implements any of the methods above or elsewhere herein, alone or in combination.

In another aspect, a computer system comprises a computer processor and a memory (or memory location) coupled to the computer processor. The memory location comprises machine-executable code that, upon execution by the computer processor, implements any of the methods above or elsewhere herein, alone or in combination.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
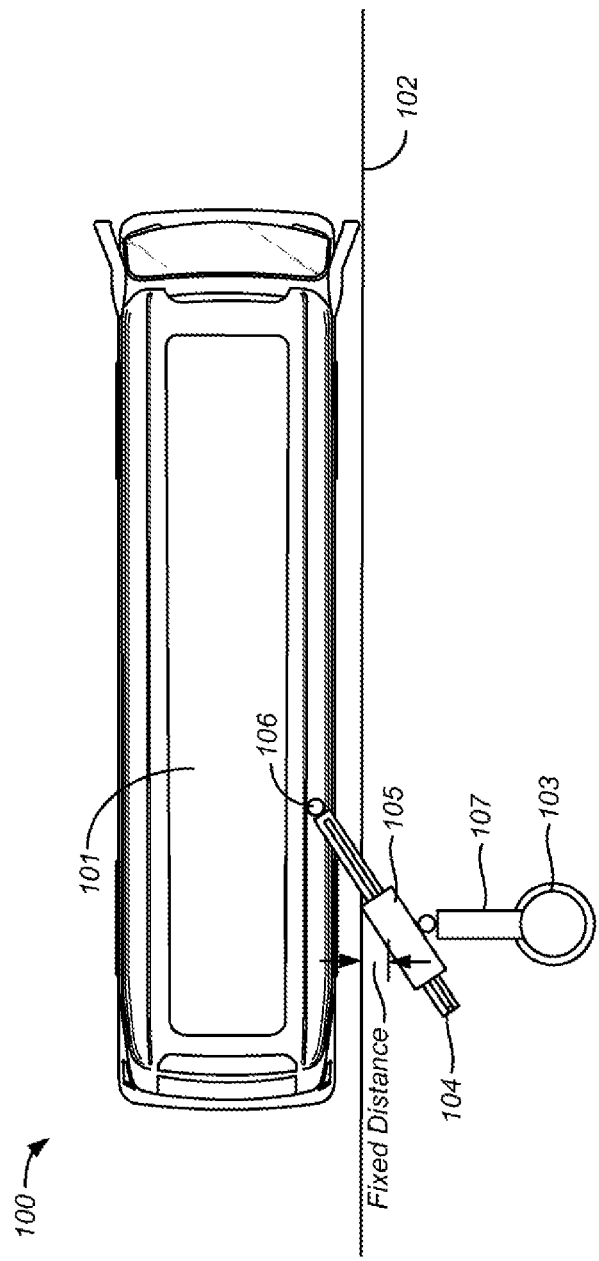
FIG. 1 is a schematic top view of a system for charging a vehicle, such as a bus, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "electric vehicle," as used herein, generally refers to an electric or hybrid electric vehicle. An electric vehicle can be an electric car, bus, motorcycle, robot, truck, train, trolley or plane. An electric vehicle can include an energy storage system, such as a battery, in addition to a power train, which can generate motion using electrical energy from the energy storage system.

The term "power source," as used herein, generally refers to a source of electrical energy or electricity. A power source be a power utility, such as, for example, a nuclear power plant, coal fired power plant, natural gas fired power plant, oil fired power plant, pumped-storage hydroelectricity, wind turbine(s) and/or solar system(s). Power can be delivered from the power source to a load (e.g., energy storage device of an electric vehicle) through a power distribution system, such as a power grid. In some examples, the power source includes the power grid. The power source can include an energy storage system that retains energy from a power utility.

The term "geographic location" (also "geo-location" and "geolocation" herein), as used herein, generally refers to the geographic location of an object, such as an electric vehicle. A geolocation of a vehicle can be determined or approximated using a geolocation device or system associated with the vehicle, which may be an electronic device (e.g., mobile device) attached to or in proximity to the vehicle. Geolocation can include the relative positioning between objects, such as between a vehicle and a charging station.

The geolocation of an object can be determined using the manner in which a geolocation device of system of or associated with the object communicates with a communication node, such as a wireless node. In an example, the geolocation of a vehicle can be determined using node triangulation, such as, e.g., wireless node, WiFi (or Wi-Fi) node, satellite triangulation, and/or cellular tower node triangulation. In another example, the geolocation of a vehicle can be determined by assessing the proximity of the vehicle to a WiFi hotspot or one or more wireless routers. In some cases, the geolocation of a vehicle can be determined using a geolocation device or system that includes a global positioning system ("GPS"), such a GPS subsystem associated with an electronic system of the vehicle.

Vehicle Charging Systems

The present disclosure provides vehicle charging systems. Vehicle charging systems provided herein can be used with various types of vehicles, including electric vehicles or gas-electric vehicles, such as, for example, buses. In some examples, vehicles can have variable heights. Exemplary electric vehicles for use with systems and methods of the disclosure include, without limitation, cars, trucks, buses, trains, scooters, motorcycles and airplanes.

A vehicle charging system can include vehicle-side equipment and charge (or charging) station-side equipment. Vehicle-side equipment (or systems) are adapted to enable charge transfer from the charge station-side equipment to an energy storage device or motion-inducing device (e.g., motor) of a vehicle having the vehicle-side equipment. An energy storage device can include a battery, such as a solid state battery or an electrochemical battery. Examples of motion-inducing devices include motors, such as electric motors or gas-electric hybrid motors.

The vehicle-side equipment is configured to couple to the charge station-side equipment at a side of the vehicle, such as at a left or right panel of the vehicle, or the front or rear panel of the vehicle. In some examples, the side of the vehicle has an orthogonal vector that is generally perpendicular to the gravitational acceleration vector. The vehicle-side equipment and/or charge station-side equipment is configured to pivot along a direction parallel to the orthogonal vector.

The vehicle-side equipment and/or charge station-side equipment can be configured to pivot along a direction that is oriented with respect to the gravitational acceleration vector at an angle that is greater than 0°. In some examples, the vehicle-side equipment and/or charge station-side equipment pivots along a direction that is oriented with respect to the gravitational acceleration vector at an angle that is greater than or equal to about 5°, 10°, 15°, 20°, 25°, 30°, 35°, 40°, 45°, 50°, 55°, 60°, 65°, 70°, 80°, or 85°. In some cases, the vehicle-side equipment and/or charge station-side equipment pivots along a direction that is oriented with respect to the gravitational acceleration vector at an angle that is greater than 0° but less than or equal to about 1°, 2°, 3°, 4°, 5°, 10°, 15°, 20°, 25°, 30°, 35°, 40°, 45°, 50°, 55°, 60°, 65°, 70°, 80°, 85°, or 90°.

Reference will now be made to the figures, wherein like numerals refer to like parts throughout. It will be appreciated that the figures are not necessarily drawn to scale.

FIG. 1 is a schematic top view of a system 100 for charging a vehicle 101, in accordance with an embodiment of the invention. The vehicle in the illustrated example is a bus, but other vehicles may be used with systems and methods of the disclosure. The bus can be a heavy duty bus. Systems of the disclosure may be used with other vehicles, such as cars, motorcycles, scooters, boats, or trains.

In the illustrated example, the bus 101 is adjacent to a curb 102. A charging station-side system comprising a pole 103 is disposed adjacent to the curb 102. The vehicle-side charging system 108 comprises a charge coupling apparatus 104 and a receiver 105. The vehicle-side charging system has an outward pivot 106 on the bus 101. The receiver 105 can be at a fixed distance in relation to the bus 101 (or the curb 102). The pole 103 can be configured to pivot along the direction of motion of the bus 101 (e.g., fore and aft). The charging station-side charging system can include a mast 107 attached to the pole 103. In some cases, the pole may twist about a pivot. The pivot point may be between the receiver 105 and the mast 107.

Figure 2:
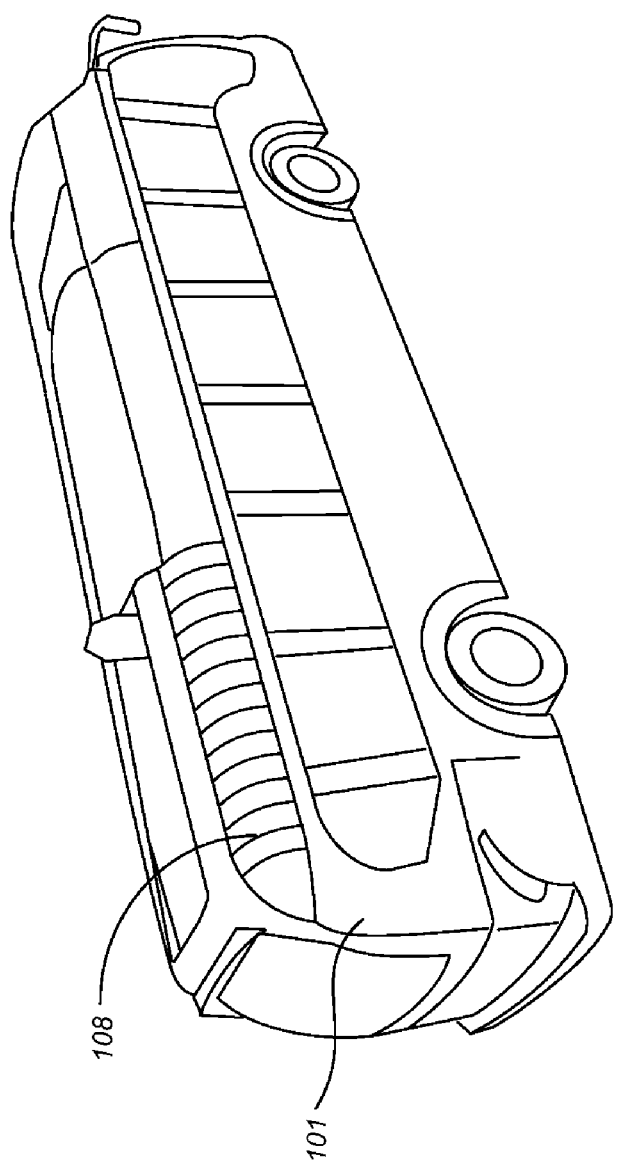
FIG. 2 shows a schematic side view of a bus comprising a vehicle-side charging system, in accordance with an embodiment of the invention.

FIG. 2 shows a schematic side view of the bus 101, showing the vehicle-side charging system 108. The vehicle-side charging system 108 includes the coupling apparatus 104, receiver 105 and outward pivot 106. The figure shows a perspective view of the charging system on the vehicle. The vehicle-side charging system can be situated away from reach by subjects, such as for safety concerns. The bus 101 can have an energy storage device for delivering power to a motion-inducing device (e.g., electric motor) of the bus. In some examples, the energy storage device and the arrangement of the energy storage device is as described with respect to a battery power source of U.S. Pat. No. 8,453,773, which is entirely incorporated herein by reference for all purposes. For example, the energy storage device of the bus 101 can be arranged with respect to a floor structure of the bus 101 such that the bus has a low floor chassis with substantially no compromise in an interior seating layout of the bus.

Figure 3:
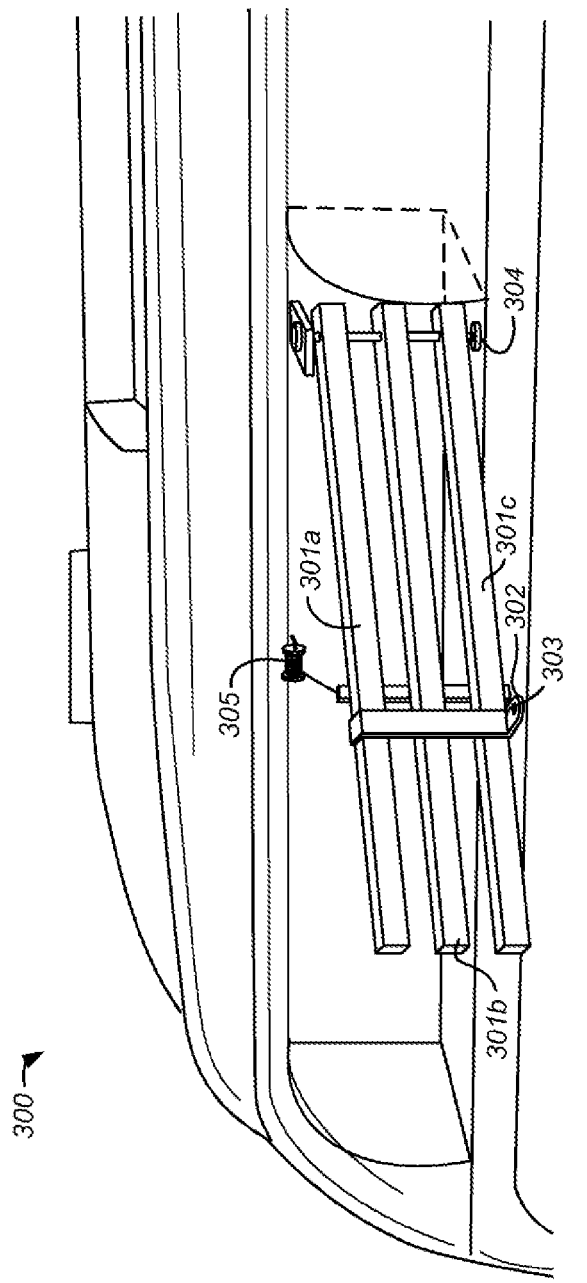
FIG. 3 shows a vehicle-side charging system, in accordance with an embodiment of the invention.

FIG. 3 shows a vehicle-side charging system 300, in accordance with an embodiment of the invention. The system 300 can include a charge coupling apparatus with charge bars and a retraction and/or extension mechanism to extend and/or retract the charge coupling apparatus. The system 300 includes a negative charge bar 301a, ground charge bar 301b, and positive charge bar 301c. The charge bars 301a, 301b and 301c can be formed of an electrically conducting material, such as a material comprising one or more elemental metals. The charge bars 301a, 301b and 301c can be configured to flex up and down, which can enable the system 300 to account for vehicle height issues in relation to a coupler of a charging station-side system (see below). Flexing of the charge bars 301a, 301b and 301c may permit the charge bars to come in contact with a receiver of the charge station-side system at various heights and configurations. The conductive portion of the bars may be much shorter so that different materials may be used for the flexible portion. A shorter conductive portion can be near the end of the coupling apparatus and be electrically connected to the bus charge system via electrical cables. The system 300 includes a locking pin feature 302. The system 300 can include a locking pin feature on a backside of the bars 301a, 301b and 301c. A front surface of each of the charge bars 301a, 301b and 301c can be a surface adapted to come in contact with a coupler of a charging station-side system for electrical energy delivery. The surface can include a flexible material 303, such as a polymeric material (e.g., rubber) or a composite material (e.g., fiberglass), which can permit at least a portion of the charge bars 301a, 301b and 301c to flex or bend. In some examples, the charge bars 301a, 301b and 301c are formed of a flexible material, and include conductive plates or surfaces for charge transfer.

The system 300 further includes a spring coil 304 and a wench or actuator 305 coupled to the bars 301a, 301b and 301c. The spring coil 304 and wench are an example of a deployment technique. It will be appreciated that other deployment techniques may be used.

A vehicle-side charging system can include any number of bars. For instance, a vehicle-side charging system can include 1, 2, 3, 4, 5, 6, 7, 8, 9, or 10 bars. In cases in which fewer than three bars are used, contact plates can be provided to bring poles of a power source in electrical communication with poles of an energy storage device of the vehicle. The ground bar or contact plate can, in some instances, be precluded.

In some examples, a vehicle-side charging system comprises a single conductor bar that is configured to extend away from and retract towards a body of a vehicle. The body of the vehicle can be formed of a metallic material or a composite material (e.g., fiberglass). In some examples, the body of the vehicle is formed of aluminum, steel, magnesium or a magnesium alloy, or fiberglass. The conductor bar includes a first contact plate on one side that is in electrical communication with a negative terminal of an energy storage device of the vehicle and a second contact plate on an opposing side that is in electrical communication with a positive terminal of the energy storage device. The contact plates are each formed of an electrically conductive material (e.g., copper or copper alloy). The charge station-side charging system can be tailored to accommodate the number of conductor bars.

Figure 4:
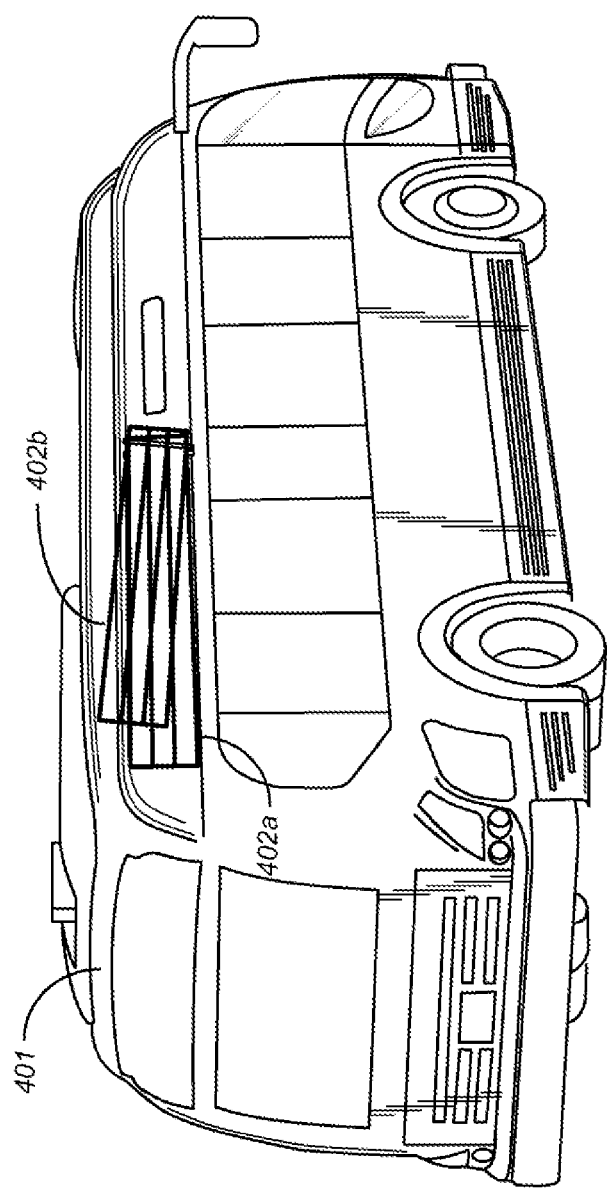
FIG. 4 is a schematic side view of a bus having a charging system with a charge coupling apparatus in a home position and the charge coupling apparatus in an extended position, in accordance with an embodiment of the invention.

FIG. 4 is a schematic side view of a bus 401 having a charging system with a charge coupling apparatus in a home position 402a and the charge coupling apparatus in an extended position 402b. In some cases, if the coupling apparatus is rigid, then the vehicle-side charging system may include a pivot to enable the charge coupling apparatus to extend away from and retract to the home position 402a. As an alternative, if the charge coupling apparatus is flexible, then it can flex and a pivot may not be required. When deployed, the coupling end of the coupling apparatus can be higher than a side of the bus 401. This can enable environmental material, such as rain, sleet, fog, condensation and/or snow, to drip or otherwise travel away from the charge coupling point towards a water management system on the bus 401.

Figure 5:
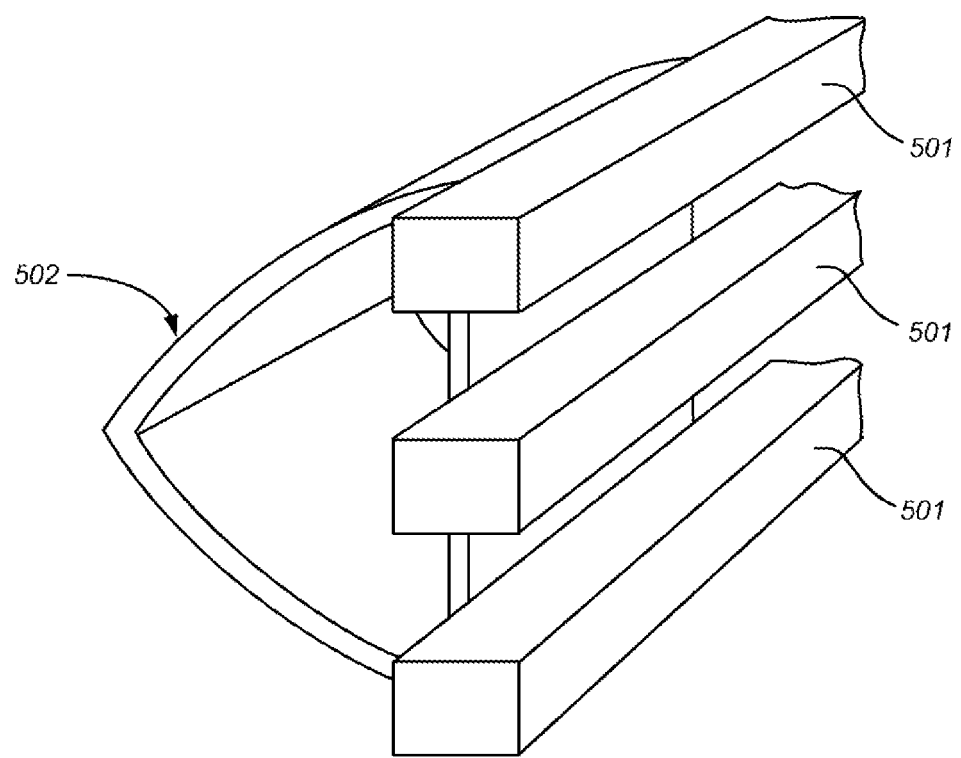
FIG. 5 is a perspective view of a vehicle-side charge coupling apparatus, in accordance with an embodiment of the invention.

FIG. 5 is a perspective view of a vehicle-side charge coupling apparatus 500, in accordance with an embodiment of the invention. The apparatus includes charge bars 501 (e.g., negative charge bar, positive charge bar, and ground charge bar), and a retraction guide 502 coupled to the charge bars 501. In some examples, the retraction guide 502 enables the bars 501 to be retracted along a given direction, such as into a holding chamber (or cavity) or housing on a side of the vehicle.

The retraction guide 502 can be a spring or mechanical device (e.g., motor) that retracts the bars 501 towards the vehicle. The retraction guide 502 can also permit the bars 501 to extend away from the vehicle, such as in the absence of a restorative force.

Figure 6:
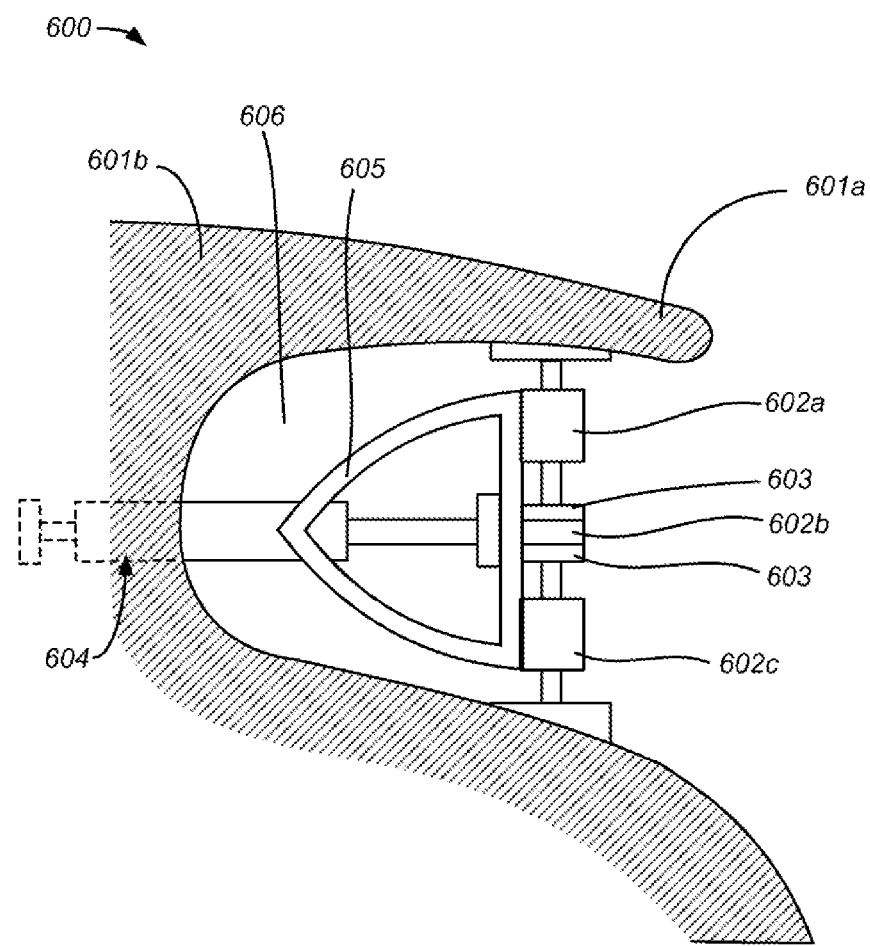
FIG. 6 is a schematic side view of a vehicle-side charging system, in accordance with an embodiment of the invention.

FIG. 6 is a schematic side view of a vehicle-side charging system 600, in accordance with an embodiment of the invention. In the illustrated example, a weather overhang 601a extends from a roof 601b of a vehicle (e.g., bus). The weather overhang 601a covers a charge coupling apparatus comprising a negative charge bar 602a, a ground charge bar 602b with adjoining pilots 603, and a positive charge bar 602c. The charge bars 602a and 602c can be high voltage charge bars, which may be configured to electrically couple to a high voltage source, such as, for example, a voltage between about 400 volts (V) and 800 V (direct current, DC), or 450 V and 750 V. The pilots 603 can be low voltage discrete safety circuits that can be present and energized to allow high voltage. Each pilot 603 allows for a discrete signal (pilot signal) to be sourced to or from the vehicle. This signal can be referenced to the vehicle chassis ground, which, in some examples, can ensure that the vehicle is grounded to earth through the charge system while charging is in process. As an alternative, or in addition to, the pilot signal can permit the charging system 600 to be disengaged from the vehicle should the vehicle, or a charging station-side system coupled to the charging system 600, find that the charging station-side system is not responding as desired, such as if the charging station-side system is not providing a given level of power output or the system 600 is not properly coupled to the charging station-side system. The pilot signal can be a 1 V, 3 V, 6 V, 12V, 28V, 24V, or a pulse-width modulation (PWM) signal, or any other electrical signal.

In the illustrated example, the vehicle-side charging system 600 includes two pilots 603, but the system 600 can include at least 1, 2, 3, 4, 5, 6, 7, 8, 9, or 10 pilots 603. In some situations, multiple pilots can provide redundancy.

The contacts of the negative charge bar 602a and the positive charge bar 602c are electrically isolated from contacts of the ground charge bar 602b. They can be electrically referenced to the ground contact as well. In some examples, the vehicle provides about 28V (DC) on these contacts with respect to the ground bar to close contactors on the charger. This can provide for a solid ground connection between the vehicle and the charger, and enable the vehicle to control whether or not power can be provided to the vehicle. An actuator 604 (e.g., air cylinder actuator) is attached or otherwise coupled (e.g., attached to the charge bars) to a retraction guide 605 that is attached to the charge bars 602a, 602b and 602c. In a home position, the charging system 600 is situated in a recess (or chamber) 606 within the vehicle (e.g., bus). During charging, the system 600 can extend out of the recess 606 and come in contact with a receiver of a charging station-side system. Following charging, the system 600 can retract into the recess 606 with the aid of the actuator 604 or a different retraction mechanism.

Figure 7:
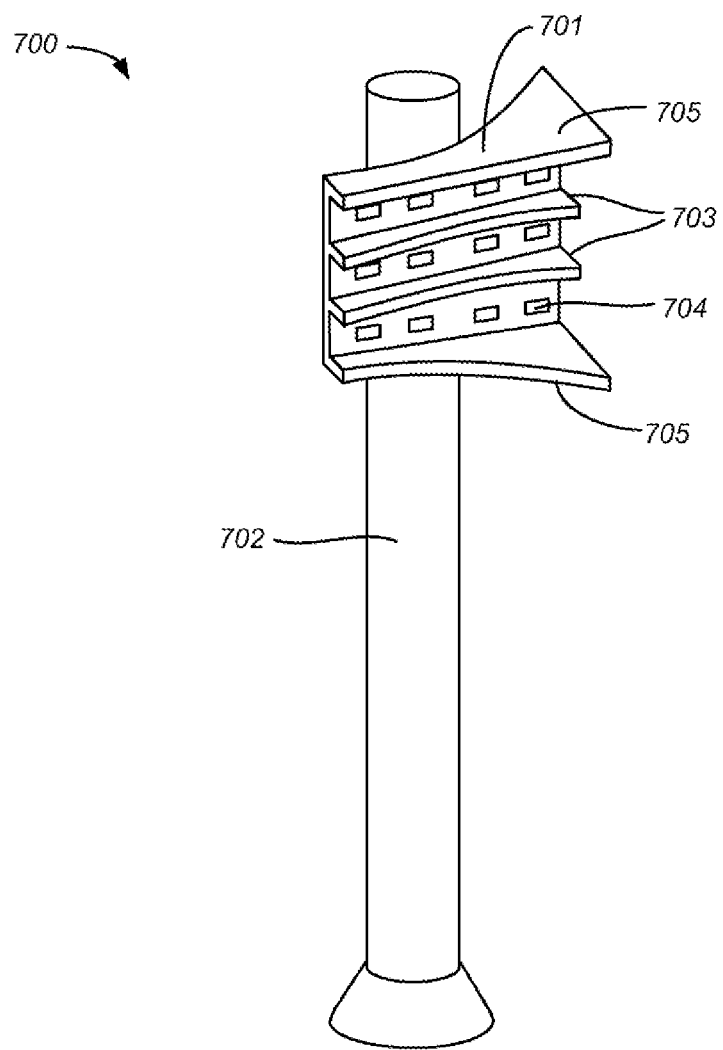
FIG. 7 shows a charging station-side system comprising a receiver supported by a pole, in accordance with an embodiment of the invention.

FIG. 7 shows a charging station-side system 700 comprising a receiver 701 supported by a pole 702, in accordance with an embodiment of the invention. The receiver 701 can pivot about the pole 702, such as along a plane orthogonal to the pole 702. The receiver 701 includes pilot contacts 703 and electrical contact members 704. The electrical contact members 704 can be charge plates or charge brushes. Each of three charge tracks that are configured to accept conductor bars from the vehicle-side charging system comprises electrical contact members 704. The illustrated example shows 12 electrical contact members, four along each track. The receiver 701 includes flared receivers 705 that are adapted to capture and guide charge bars from the vehicle-side charging system (see above) to the electrical contact members 704 for charging. A distance between the flared receivers 705 can be wider along a first side of the receiver than a second side of the receiver 701. During charging, charge bars from the vehicle-side charging system first enter the first side of the receiver 701 and leave the receiver 701 from the second side of the receiver 701. The first side is opposite the second side.

A side of the receiver 701, such as a street side, may be open to enable charge bars from the vehicle-side charging system to enter the receiver 701 and come in contact with the electrical contact members 704 for charge transfer from a power source. The electrical contact members 704 can be in electrical communication with a power source, such as, for example, a power source that delivers DC power between about 400 V and 800 V, or 450 V and 750 V. In some examples, the power source can supply power at about 600 V.

The electrical contact members 704 are situated along a back plane of the receiver 700. As an alternative, the electrical contact members 704 can be situated on one or both of the sides of each of the three tracks. A first or first set of electrical contact members can be electrically coupled to a first pole of the power source (e.g., positive pole), a second or second set of electrical contact members can be electrically coupled to a second pole of the power source (e.g., negative pole), and a third or third set of electrical contact members can be electrically coupled to ground.

The electrical contact members 704 can be compressible or depressible. They can be configured to compress upon the force resulting from contact with a conductor bar, and return to their original position once the contact has been removed. In some examples, the electrical contact members 704 are spring-loaded.

Figure 8:
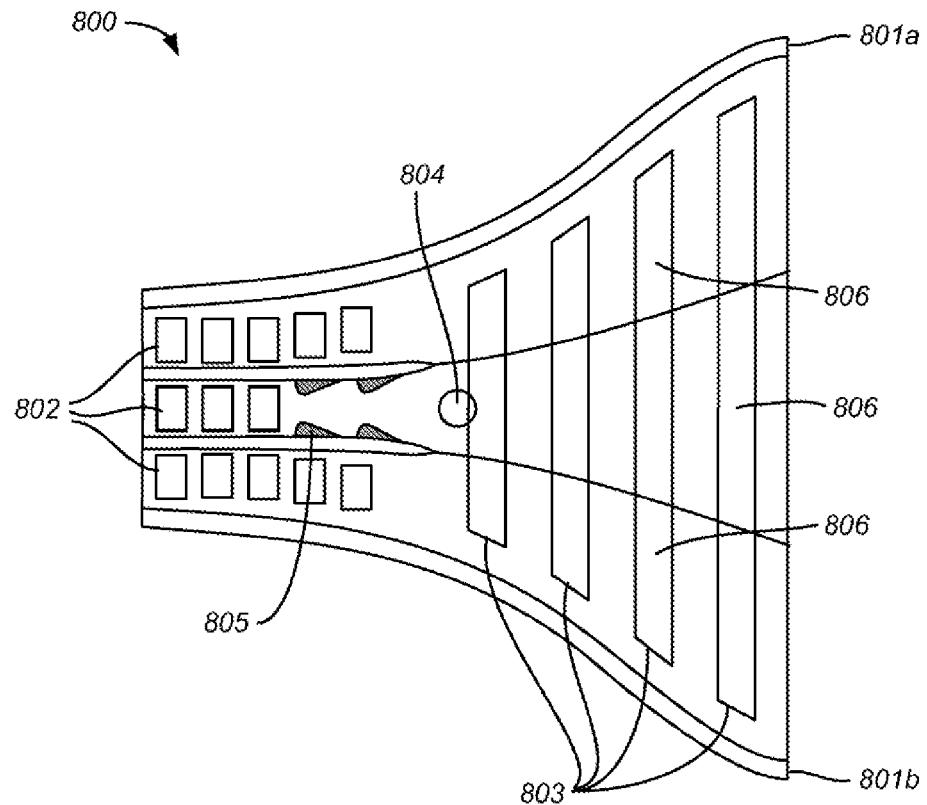
FIG. 8 schematically illustrates a receiver for use with a charging station-side system, in accordance with an embodiment of the invention.

FIG. 8 schematically illustrates a receiver 800 for use with a charging station-side system, in accordance with an embodiment of the invention. The receiver 800 includes an upper funnel 801a and a lower funnel 801b. The upper funnel 801a can provide rain protection. The receiver 800 includes a plurality of spring-loaded brushes 802 that are adapted to come in contact with conductor (or charge) bars of a vehicle-side charging system, as described elsewhere herein. As an alternative, the receiver 800 can have a single brush for each contact. The contact may be an electrical conductor to electrical conductor contact (e.g., metal-to-metal). The receiver 800 includes a plurality of polymeric (e.g., delrin) inserts 803 to, for example, provide a low coefficient of friction contact. The receiver also includes a twist point 804 that mounts to a stand (see FIGS. 7 and 9). The twist point 804 can provide a pivot point to permit the receiver 800 to pivot or rotate. A plurality of spring loaded pilot brushes 805 are adapted to come in contact with a pilots adjoining a ground charge bar of the vehicle-side charging system (see, e.g., FIG. 6). The receiver 800 includes a back plane 806.

The brushes 802 and 805 can be formed of a metallic or metal-containing material. The brushes can be formed of a material that has an electrical conductivity that is suited for charge transfer. Examples of metallic materials include, without limitation, gold, silver, nickel, iron, copper or a combination thereof.

The receiver 800 includes a plurality of walls that define tracks (or passages) for accepting conductor bars. Each of the tracks guides a conductor bar to brushes along the tracks. The brushes are configured to provide electrical energy, such as electrical energy from a power grid, which can be in electrical communication with a power utility (e.g., nuclear power plant, coal fired power plant, natural gas fired power plant, oil fired power plant, wind turbine(s), solar system(s)).

In some situations, a first set of brushes along a first track are the positive terminal of a source of electrical energy, a second set of brushes along a second track are the negative terminal of the source of electrical energy, and a third set of brushes along a third track are the ground terminal. The third set can be between the first and second set.

The tracks can include guide members that enable conductor bars of the vehicle-side charging system to align with the charge station-side charging system. The guide members can enable an individual conductor bar to align with an individual track.

Figure 9:
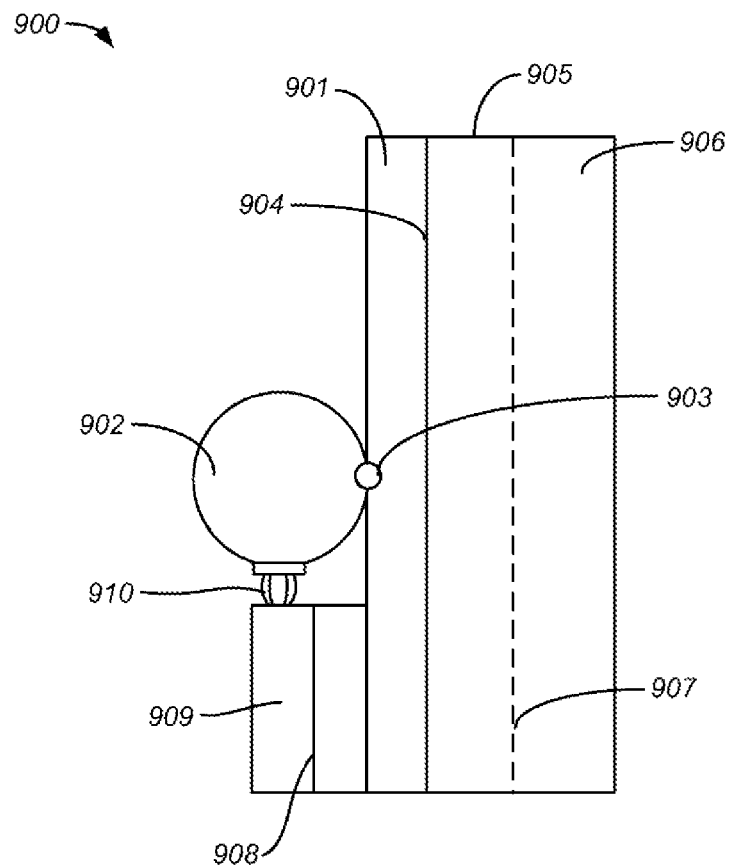
FIG. 9 schematically illustrates a top view of a receiver for use in a charging station-side system, in accordance with an embodiment of the invention.

FIG. 9 schematically illustrates a top view of a receiver 900 for use in a charging station-side system, in accordance with an embodiment of the invention. The system includes a receiver 901 mounted on a pole (or stand) 902. The receiver 900 can pivot around the pole 902 at a pivot point 903. In some examples, the receiver 900 can rotate along a direction of vehicle movement. The receiver 900 can pivot when it comes in contact with conductive bars of a vehicle-side charging system, as described elsewhere herein (see, e.g., FIG. 3 and accompanying text). The receiver 900 includes a back plane 904, lower funnel wall 905 and upper funnel wall 906. The upper funnel wall 906 may be wider than the lower funnel wall 905 (as measured from the back plane 904). The receiver 900 includes brushes 907 and a high voltage connection panel 908. High voltage cables 909 (e.g., cables suited for a voltage from about 400 V to 800 V), which are in electrical communication with the high voltage connection panel 908, are in electrical communication with the brushes 907 and high voltage cables in the pole 902. A high voltage drip loop 910 brings the high voltage cables 909 in contact with the high voltage cables in the pole 902.

A receiver can pivot or rotate to permit conductor bars of a vehicle-side charging system to come in electrical communication with electrical contact members of the charge station-side charging system. The receiver can pivot or rotate by at least about 1°, 2°, 3°, 4°, 5°, 6°, 7°, 8°, 9°, 10°, 15°, 20°, 25°, 30°, 35°, 40°, 45°, 50°, 55°, 60°, 65°, 70°, 75°, 80°, 85°, or 90°. In some cases, the receiver includes a spring-loaded member that permits the receiver to rotate to its original position once the conductor bars have disengaged from the electrical contact members (e.g., brushes).

A charge station-side charging system can include any number of tracks. For instance, a charge station-side charging system can include 1, 2, 3, 4, 5, 6, 7, 8, 9, or 10 tracks. In cases in which fewer than three tracks are used, electrical contact members can be provided to bring poles of a power source in electrical communication with poles of an energy storage device of a vehicle. The ground electrical contact member can, in some instances, be precluded.

In some examples, a charge station-side charging system comprises a single track bar that is configured to come in contact with a single conductor bar of an electric vehicle. The track includes a first contact plate on one side that is in electrical communication with a negative terminal of a power source and a second contact plate on an opposing side that is in electrical communication with a positive terminal of the power source. The contact plates are each formed of an electrically conductive material (e.g., copper or copper alloy).

It will be appreciated that any of the charging station-side systems of FIGS. 7-9 can be used with any of the vehicle-side systems of FIGS. 1-6, and vice versa. The systems of FIGS. 1-9 can be employed for use with various types of electrical vehicles, such as cars and buses.

During use, power may be delivered from a charging station-side system to the vehicle via the vehicle-side system upon contact between bars (or charging members) of the vehicle-side system and brushes of the charging station-side system. The contact may be intermittent or continuous. In some cases, the contact is for a period that is less than or equal to about 20 minutes, 10 minutes, 5 minutes, 4 minutes, 3 minutes, 2 minutes, 1 minute, or 30 seconds.

Vehicle-side System Features

The vehicle-side system can have various features and functionalities. The vehicle-side charging system can include a charging member (e.g., charge bars) for electrically coupling an energy storage device of a vehicle to an energy delivery (or power) system. In some embodiments, the charging member is a bar. The vehicle-side charging system can include one or more bars. For example, the vehicle-side charging system can include 1, 2, 3, 4, 5, 6, 7, 8, 9, 10, or more bars. The bars can have various shapes and sizes. For example, the bars can be circular, cylindrical, square, or rectangular.

In some cases, the vehicle side charging system comprises a packaging in a rear curb-side fairing of the vehicle. The charging member can include three conductor bars packaged in the fairing. In some examples, the charging member includes two high voltage current conductors for charging and a ground conductor (or electrode). The ground conductor can have a pilot lead for safety interlock. In some cases, the charging member can include a component for wired or wireless controller area network (CAN) connections or other automotive-grade multi-drop serial communication. The charging member can include one or more components for any serial communication. This is a specific automotive-grade multi-drop serial communication.

In some examples, a conductor bar can be formed of an electrically conductive material. In other examples, a conductor bar can be formed of a non-conductive material and include one or more surfaces coated with an electrically conductive material. Conductor bars may be electrically coupled to wiring that bring a conductor bar in electrical communication with an energy storage system of a vehicle.

The charging members in some cases can include 1 m, 2 m, 3 m, 4 m, 5 m, 6 m, 7 m, 8 m, 9 m, 10 m, or longer bars. The bars can be configured to bring an energy storage unit or motor of the vehicle in electrical contact with a charging station. The length of the individual bars may be selected to provide an electrical contact between an individual charging member and charge coupler device on the charging station-side equipment (or system). The length may be selected based on various factors, such as, for example, electrical needs, weight and/or the permissible distance of the vehicle from a curb.

Bars can be sized to handle high current charge with acceptable resistance losses. In some examples, bars may be sized to handle a current of at least about 1000 amps. The bars can be conductive, and in some cases the bars can be formed of a non-conductive material. Bars can be formed of an electrically conductive material, such as a conductive non-metallic material (e.g., graphene) or metallic material (e.g., copper, aluminum or combinations thereof). The bars may have a first material (e.g., conductor) near a first end and a second material (e.g., second conductor) near a second end.

The bars can be substantially rigid so as to put force directly away from the vehicle (e.g., bus) onto a receiver of the charging station. The bars can be configured to be mounted in such a way that they pivot at the front-most point in their packaging envelope. For instance, there may be a common pivot point or several different pivot points. In some cases, the bars are isolated from each other and from the vehicle.

The bars can be deployed and brought in electrical communication with a receiver of a charging station with the aid of a deployment member. In some examples, the deployment member can be a spring loaded device or a pneumatic device. The deployment member can be spring-loaded (or pressure-loaded) to normally deploy outward from the deployed end at a slight upward angle. The deployment can also be passive such that any motion (e.g., in or out), such as, for example, with the aid of an air cylinder, is an active action. The bars can be raised or lowered with the aid of an active or passive pneumatic cylinder on the vehicle (e.g., rear gate lift). The bars can be raised or lowered with the aid of a spring, such as, for example, a leaf spring or coil spring. The coupling end of the bars can also be raised or lowered as a result of the bars being flexible and the motion of the bars being guided through the receiver as the vehicle reaches a final "docked" position.

In some embodiments, the deployment member can provide force or contact pressure to a bar that is sufficient to provide electrical contact between the bar and the charging station, such as a coupler of the charting station. The deployment member can, in some cases, be the same system used to deploy catenary devices.

Bars may be deployed and retracted with the deployment member, or deployed with the deployment member and retracted with a separate device. In some cases, bars may be retracted with one or more of a wench, pneumatic system and catenary device (or system). The vehicle-side charging system may include a wedge-shaped receptacle or guide to guide bars to a resting position.

In some situations, bars deploy in an upward angle (e.g., in relation to a bottom or base portion of a vehicle). In some examples, bars deploy in a slightly upward angle, such as an angle that is at least about 0.5°, 1°, 5°, 10°, 20°, or 30° in relation to the base of the vehicle. In some cases, the vehicle-side charging system is structured such that rain on bus bars drip toward the vehicle.

Bars can be configured to move upward, such as away from a body of the vehicle. In some situations, vertical differences between buses and curbside couplers may need to be accounted for during design of the charging system. Bars may pivot upward at front pivot point. In some cases, bars may have flexibility and may be configured to flex upward.

Bars can be formed of one or more individual pieces. In some cases, bars may be formed of multiple pieces. Such a construction may permit bars to bend or flex in various orientations, enabling coupling to charge station-side equipment. In some cases, a bar cannot flex downward or inward (e.g., towards a body of the vehicle). Inward flexing may make it difficult to control force applied to charge brushes of individual bars. The bar assembly may also be formed of one or more pieces.

In some situations, the bars are high voltage bars having high voltage connections. High voltage connections to high voltage bars may have drip loops. A drip loop may have a 15 cm drop. In some situations, each cable drip loop can direct water or other incident fluid on a different path.

Bars may be locked in fairing enclosure with a secondary pin lockout. Safety can be critical for a normally-deployed device.

The vehicle-side charging system may include a fairing cover. In some cases, the cover may be precluded. In such a case, the charge bar system can be recessed such that it is protected from the environment in a home (e.g., retracted) position. An opening of the charge bar system can be designed so that it protects the charge equipment while allowing debris to slide out.

In cases in which the vehicle-side charging system includes a fairing cover, the cover may flip up to provide rain protection to the pivot system, or flip down to get out of the way. If the fairing cover opens, actuation can be controlled by mechanical cam coupling to bar system. A cam may be a rotating or sliding piece of mechanical linkage.

Charge Station-side System Features

The charge station-side system may have various features and functionalities. For instance, the charge station-side system can be adapted to electrically couple to the vehicle-side system to provide energy to the vehicle. Energy may be provided from the charge station to the vehicle (e.g., bus) to power the vehicle or charge an energy storage device (e.g., battery) of the vehicle.

The charge station-side system can include a receiver mounted on a pole that is attached to ground or other structure. In some cases, the pole can be situated on the side of a road, street, or other structure adapted to permit vehicular travel.

The receiver can have a relatively small footprint. In some examples, a connection point to a support surface (e.g., concrete surface) is less than or equal to that of a standard traffic light pole. A connection point between the receiver and the pole can, in some examples, be about 8 inches by 8 inches, such as for permitting pivoting. In some examples, the receiver can have a height of about 3 feet at a wide end of the receiver and about 1 foot at a narrow end of the receiver. In some examples, the receiver has a depth of about 1.5 feet, which can provide environmental protection, such as, for example, protection again rain. The depth can be suited for the brush and wiring assemblies.

The receiver can be set up with a small funnel system for guiding charge bars into place. In some cases, tolerances for angles in constructing the funnel may need to be considered. For instance, the funnel may be configured to accept charge bars (from the vehicle) at a slightly upward angle. In other examples, the vehicle may be travelling on an uneven or angled road (e.g., crowned road), and the funnel may be configured to account for such an uneven or angled road. In other examples, the vehicle may be traveling on an inclined road (e.g., up a hill), and the funnel may be configured to account for the incline. There may be installation roadway requirements to account for the incline.

The receiver can be set up with brushes mounted on the receiver. The brushes may be spring loaded. The brushes can be configured to mate with individual poles or components of the poles of the vehicle-side charging system. The brush architecture may be many brushes per conductor or a single larger brush per each conductor.

The receiver can be oriented on a two-axis rotational pivot so that maximum contact can be made with charge bar surfaces. In some cases, the receiver can tilt around the center of the pole to account for the stopping position of the vehicle. The receiver may rotate around the center of the coupler to account for height differences in the vehicle.

The receiver can be set up with self-return springs so that it can rotate to an original position after charge. The receiver can include a cover (e.g., umbrella) over an interface of the receiver. The cover may protect the receiver from the environment, such as, for example, rain or wind. In some cases, the cover can be incorporated as a top portion of the funnel apparatus. The cover may have a footprint that is lower than a footprint of the receiver.

Systems (e.g., charge station-side systems) of the disclosure can be configured to provide rapid charging of electric or hybrid vehicles, such as vehicles having charge times less than or equal to about 1 day, 12 hours, 6 hours, 3 hours, 2 hours, 1 hour, 30 minutes, 20 minutes, 10 minutes, 5 minutes, 1 minute, or 30 seconds. Systems of the disclosure can be configured to charge an energy storage device of an electric vehicle to a state of charge of at least about 10%, 20%, 30%, 40%, 50%, 60%, 70%, 80%, 90%, 90%, or 99% in a time period of less than or equal to about 1 day, 12 hours, 6 hours, 3 hours, 2 hours, 1 hour, 30 minutes, 20 minutes, 10 minutes, 5 minutes, 1 minute, 30 seconds, 15 seconds, 10 seconds, or less. This time period can include the time required for the vehicle and charge station to prepare to deliver electrical energy to an energy storage device of the vehicle, which can include extending one or more conductor bars of the electric vehicle.

Systems of the disclosure can charge an energy storage device of an electrical vehicle by delivering at least about 10 kilo-Watt hour (kWh), 20 kWh, 30 kWh, 40 kWh, 50 kWh, 60 kWh, 70 kWh, 80 kWh, 90 kWh, 100 kWh, 200 kWh, 300 kWh, 400 kWh, or 500 kWh of energy in a time period that is less than about 2 hours, 1 hour, 30 minutes (min), 20 min, 15 min, 10 min, 5 min, 4 min, 3 min, 2 min, 1 min, or 30 seconds. In some examples, an energy storage device of an electric vehicle charges at between about 10 kWh and 100 kWh, or 40 kWh and 70 kWh in a time period that is between about 30 seconds and 20 minutes, or 1 minute and 15 minutes (e.g., 10 minutes) at a power output that is at least about 100 kW, 200 kW, 300 kW, 400 kW, or 500 kW.

Vehicle-side and charge station-side systems of the present disclosure can charge an energy storage device of an electric vehicle while the electric vehicle is stationary or moving. In some examples, a vehicle-side system electrically couples to a charge station-side system while the vehicle is moving at a velocity that is less than or equal to about 10 miles per hour (MPH), 9 MPH, 8 MPH, 7 MPH, 6 MPH, 5 MPH, 4 MPH, 3 MPH, 2 MPH, or 1 MPH. In some examples, a charge rate can be controlled through conductive serial communication or by wireless communication while the vehicle is not moving.

Charge station-side systems of the present disclosure can deliver power rapidly or substantially rapidly. Charge station-side systems of the present disclosure can deliver power at greater than or equal to about 1 kilo-watt (kW), 10 kW, 20 kW, 30 kW, 40 kW, 50 kW, 60 kW, 70 kW, 80 kW, 90 kW, 100 kW, 150 kW, 160 kW, 170 kW, 180 kW, 190 kW, 200 kW, 250 kW, 300 kW, 400 kW, 500 kW, 1 mega-watt (MW), 2 MW, 3 MW, 4 MW, 5 MW, 6 MW, 7 MW, 8 MW, 9 MW, or 10 MW, or more. Charge station-side systems of the present disclosure can provide a voltage that is greater than or equal to about 1 volt (V), 10 V, 20 V, 30 V, 40 V, 50 V, 60 V, 70 V, 80 V, 90 V, 100 V, 200 V, 300 V, 400 V, 500 V, 600 V, 700 V, 800 V, 900 V, or 1000 V. Charge station-side systems of the present disclosure can provide a current that is greater than or equal to about 1 amp (A), 10 A, 20 A, 30 A, 40 A, 50 A, 60 A, 70 A, 80 A, 90 A, 100 A, 200 A, 300 A, 400 A, 500 A, 600 A, 700 A, 800 A, 900 A, or 1000 A. Such power may be sustained for a given duration to provide a requisite or predetermined amount of energy (e.g., electrical energy). In some situations, depending on the power level, charge station-side systems of the present disclosure can deliver from about 1 kWh and 1000 kWh, or 5 kWh and 500 kWh, or 9 kWh and 250 kWh of energy in a time period from about 5 seconds (s) to 15 minutes (min), 10 s to 10 min, or 15 s to 5 min. For example, 500 kW can be maintained for 1 hour to provide 500 kWh of energy, 500 kW can be maintained for 30 minutes to provide 250 kWh of energy, or 100 kW can be maintained for two hours to provide 200 kWh of energy.

In some examples, a charging system can provide legacy support. For instance, a charging system can have V1/V2 mixed fleet charge station compatibility. The charging system can be capable of handling inclement weather during normal service.

Systems of the disclosure can provide for relatively simple controls. In some embodiments, a vehicle-side charging system is deployed if the vehicle is at or near a charging station-side system. In some examples, the vehicle-side charging system is deployed if the vehicle (e.g., bus) is at a distance that is less than or equal to about 100 feet, 50 feet, 40 feet, 30 feet, 20 feet, 10 feet, 5 feet, 4 feet, 3 feet, 2 feet, or 1 foot from the charging station-side system (e.g., pole and/or receiver). The vehicle-side charging system can be deployed (e.g., extended from the vehicle) when the vehicle is approaching the charging station-side system at a velocity that is less than or equal to about 30 miles per hour (MPH), 25 MPH, 20 MPH, 15 MPH, 10 MPH, 9 MPH, 8 MPH, 7 MPH, 6 MPH, 5 MPH, 4 MPH, 3 MPH, 2 MPH, or 1 MPH.

A vehicle-side charging system, including one or more conductor bars, can be deployed manually or automatically. The vehicle-side charging system can be manually deployed by a user of an electric vehicle having the vehicle-side charging system or a user of the charging station. In some embodiments, the vehicle is configured to recognize that it is at, near or adjacent to a charging station. In such a case, the vehicle can automatically deploy the vehicle-side charging system. For instance, the vehicle can have a system that is adapted to recognize that it is at a charging station. The vehicle may include radiofrequency identification (RFID) technology to permit the vehicle to recognize that it is at or near a charging station. Such identification can be made with the aid of a geolocation system on the vehicle, such as, for example, a global positioning system (GPS). The identification portion can reside on the vehicle side. In some cases this can preclude the need for wireless CAN communication (or connection). Such an identification system can be implemented, for example, by one or more of the following: 1) a radio frequency (RF) receiver in a vehicle and an RF transmitter or tag at or near a charging-station side system, such as in a support structure (e.g., concrete); 2) one or more magnetic sources in a support structure and a Gaussian receiver or pickup on a vehicle; 3) one or more RF transmitter(s) in a support structure (e.g., concrete) and RF receivers in a vehicle; 4) bar code scanners; 5) a global positioning system; and 6) wireless (or node) triangulation. The vehicle can then deploy the coupling mechanism based on the location of the vehicle in relation to the location of the charging station-side system, such as, for example, based on the position of the vehicle in relation to the position of a support structure (e.g., pole) supporting a receiver of the charging station-side system.

Control Systems

Figure 10:
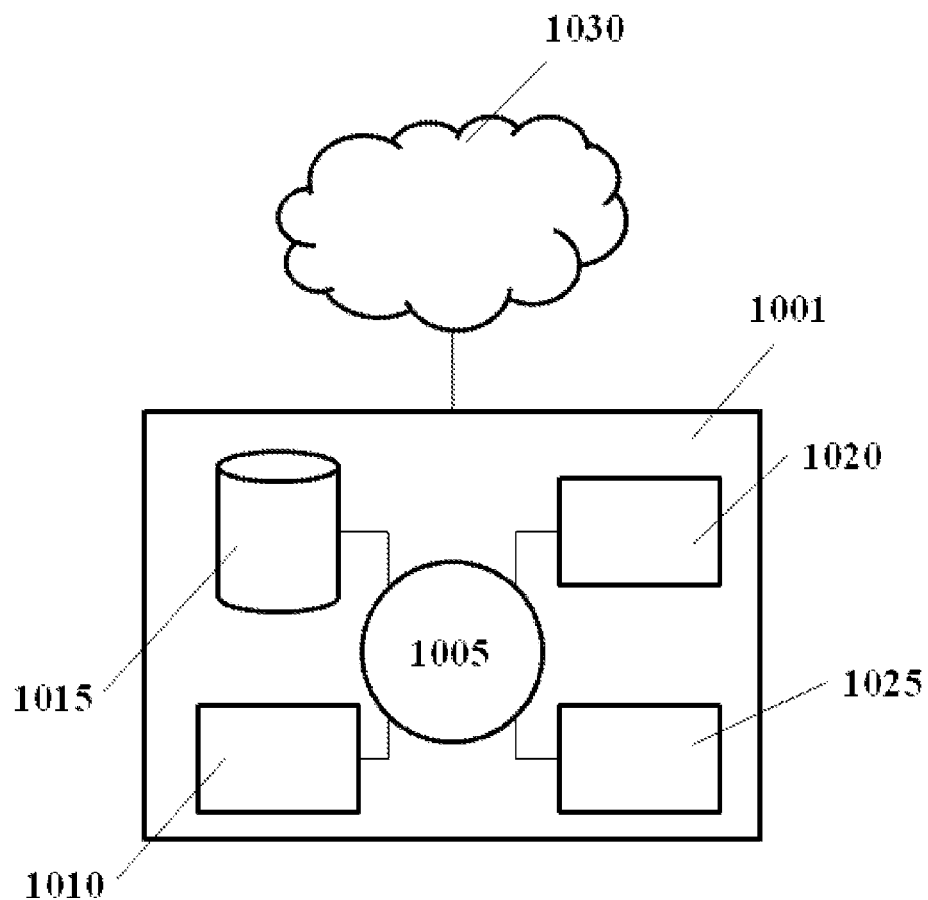
FIG. 10 shows a computer system that is programmed or otherwise configured to implement vehicle charging methods of the present disclosure.

The present disclosure provides computer control systems that are programmed to implement methods of the disclosure. FIG. 10 shows a computer system 1001 that is programmed or otherwise configured to charge an electric vehicle. The computer system 1001 can regulate various aspects of vehicle charging and/or discharging using vehicle-side and charge station-side systems of the present disclosure, such as, for example, vehicle approach to a charge station, deploying a vehicle-side charging system (e.g., deploying one or more conductor bars), rotating a receiver of the charge-station side system and regulating the flow of electrical energy to or from an energy storage device of the vehicle and a power source.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. Examples of operations performed by the CPU 1005 can include fetch, decode, execute, and writeback.

The storage unit 1015 can store files, such as drivers, libraries and saved programs. The storage unit 1015 can store programs generated by users and recorded sessions, as well as output(s) associated with the programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display that comprises a user interface (UI) for providing, for example, operational parameters of a charging station, and/or electric vehicle. Examples of UI's include, without limitation, a graphical user interface (GUI) and web-based user interface.

Systems and methods provided herein may be combined with or modified by systems and methods provided in U.S. Patent Publication Nos. 2013/0057211 ("CHARGING CONTROL SYSTEM AND CHARGING CONTROL METHOD") and 2013/0127414 ("ELECTRIC CHARGING SYSTEM AND ELECTRIC VEHICLE"), and Patent Cooperation Treaty Patent Publication Nos. WO/2010/132443 ("SYSTEMS AND METHODS FOR PROVIDING ELECTRIC GRID SERVICES AND CHARGE STATIONS FOR ELECTRIC VEHICLES"), WO/2011/139675 ("FAST CHARGE STATIONS FOR ELECTRIC VEHICLES IN AREAS WITH LIMITED POWER AVAILABILITY"), WO/2012/040369 ("SYSTEMS AND METHODS FOR EQUIVALENT RAPID CHARGING WITH DIFFERENT ENERGY STORAGE CONFIGURATIONS") and WO/2011/139680 ("SYSTEMS AND METHODS FOR AUTOMATIC CONNECTION AND CHARGING OF AN ELECTRIC VEHICLE AT A CHARGING STATION"), each of which applications is entirely incorporated herein by reference for all purposes.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A charging system for an electric bus, comprising:
    (a) the electric bus including a side-facing charging interface positioned proximate a roof of the bus, the charging interface including:
        a housing having an opening facing towards a side of the bus; and
        a plurality of charge-receiving electrodes positioned in the housing, wherein the plurality of charge-receiving electrodes are moveable with respect to the side of the bus;
    (b) a charging station, the charging station including:
        a charge head attached to a stationary surface of the charging station at a pivot, wherein the charge head is rotatable about the pivot; and
        a plurality of charging electrodes positioned in the charge head; and
    (c) a control system configured to detect the bus approaching the charging station, and based at least on the detection:
        rotate the charge head about the pivot to align the plurality of charging electrodes with the plurality of charge-receiving electrodes; and
        automatically decrease a distance between the charge head and the housing to engage the plurality of charging electrodes with the plurality of charge-receiving electrodes.

2. The charging system of claim 1, wherein the electric bus further includes a lid hinged on the housing and covering the opening, wherein the lid is configured to rotate about the hinge to expose the opening, and wherein the plurality of charge-receiving electrodes are moveable away from the side of the electric bus.

3. The charging system of claim 1, wherein the control system is further configured to regulate the flow of electric current from the charging station to the bus.

4. The charging system of claim 1, wherein a number of charging electrodes is equal to a number of charge-receiving electrodes, and wherein the plurality of charge-receiving electrodes are rotatable with respect to the side of the bus.

5. The charging system of claim 1, wherein the plurality of charging electrodes are spring loaded electrodes.

6. The charging system of claim 1, wherein the plurality of charge-receiving electrodes includes a pilot electrode that is configured to detect a discrepancy in charging.

7. The charging system of claim 1, wherein the charging interface is positioned on a curb-side fairing of the bus, and wherein the electrodes of the charging interface may rotate about an axis normal to the direction of travel of the bus.

8. The charging system of claim 1, wherein the plurality of charging electrodes includes conductive brushes.

9. The charging system of claim 1, wherein the control system is configured to rotate the charge head about an axis normal to the direction of travel of the bus.

10. The charging system of claim 1, wherein the control system is configured to detect the approaching bus using RFID.

11. A method of charging an electric bus at a charging station, wherein the bus includes a side-facing charging interface positioned proximate its roof, wherein the charging interface comprises electrodes, wherein the electrodes are moveable with respect to the side of the bus, and the charging station includes a charge head attached to a stationary surface of the charging station at a pivot, wherein the charge head is configured to engage with the charging interface to charge the bus, the method comprising:
using a control system to detect the bus as it approaches the charging station;
automatically rotating the charge head about the pivot to align the charge head with the charging interface of the bus; and
automatically decreasing a distance between the charge head and the charging interface to engage electrodes of the charge head with electrodes of the charging interface.

12. The method of claim 11, wherein the automatically rotating includes rotating the charge head about an axis normal to the direction of travel of the bus, and wherein the electrodes of the charging interface are moveable away from the side of the bus.

13. The method of claim 11, wherein the charging interface includes a hinged lid that covers the electrodes of the charging interface, wherein the electrodes of the charging interface are rotatable about an axis normal to the direction of travel of the bus, and wherein the control system is configured to automatically open the lid prior to automatically decreasing the distance.

14. The method of claim 11, further including activating charging the bus after engaging the electrodes of the charge head with the electrodes of the charging interface.

15. The method of claim 11, wherein detecting the bus includes identifying the bus using RFID.

16. A charging system for an electric bus, comprising:
(a) the electric bus including a side-facing charging interface positioned proximate a roof of the bus, the charging interface including:
a housing having an opening facing a curb-side of the bus;
a lid hinged on the housing and covering the opening; and
a plurality of charge-receiving electrodes positioned in the housing and covered by the lid, wherein the charge-receiving electrodes are moveable with respect to the side of the bus;
(b) a charging station, the charging station including:
a charge head attached to a stationary surface of the charging station at a pivot, wherein the charge head is rotatable about the pivot; and
a plurality of charging electrodes positioned in the charge head; and
(c) a control system configured to automatically (i) open the lid of the bus to expose the plurality of charge-receiving electrodes, (i) rotate the charge head about the pivot to align the plurality of charging electrodes with the plurality of charge-receiving electrodes, and (ii) decrease a distance between the charge head and the charging interface to engage the plurality of charging electrodes with the plurality of charge-receiving electrodes.

17. The charging system of claim 16, wherein the control system is further configured to regulate the flow of electric current from the charging station to the bus.

18. The charging system of claim 16, wherein a number of charging electrodes is equal to a number of charge-receiving electrodes, and wherein the charge-receiving electrodes are moveable away from the side of the bus.

19. The charging system of claim 16, wherein the plurality of charging electrodes are spring loaded electrodes, and wherein the charge-receiving electrodes are rotatable with respect to the side of the bus.

20. The charging system of claim 16, wherein the plurality of charge-receiving electrodes includes a pilot electrode that is configured to detect a discrepancy in charging.

* * * * *